Patented Feb. 11, 1936

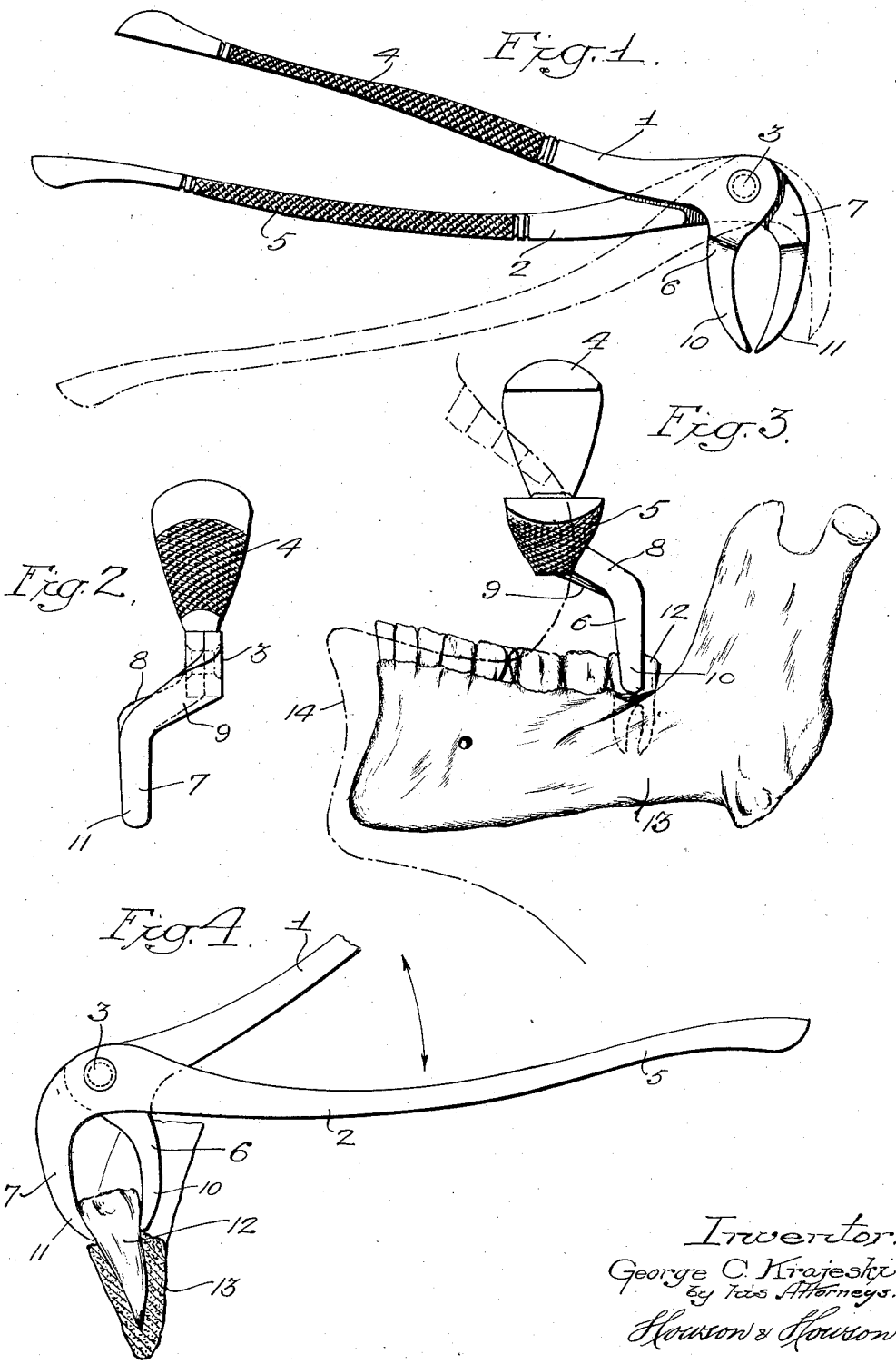

2,030,798

UNITED STATES PATENT OFFICE 2,030,798

DENTAL FORCEPS

George C. Krajeski, Philadelphia, Pa.

Application February 12, 1934, Serial No. 710,911

1 Claim. (Cl. 32—62)

This invention relates to dental forceps and has for its principal object the provision of a novelly constructed instrument of this nature which is particularly adapted to the extraction of lower molars, especially lower wisdom teeth.

In the extraction of a lower molar, it is practically necessary to use forceps with handles in superposed relation one to the other and having beaks extending downwardly and gripping the tooth in a direction substantially parallel to the longitudinal axis of the forceps and substantially at right angles to the direction of operation of the forceps handles. With the exposed front and back surfaces of the tooth gripped by forceps inserted in the mouth from the side, extraction may be effected by moving the forceps handles in lever fashion and finally moving the handles forcibly downward to remove the tooth from its socket.

While a front tooth may be extracted by a twisting or rotary motion of ordinary forceps, any attempt to thus extract a molar may result in breaking the tooth and in improper extraction. The reason for this is that a molar may be easily broken because of its structure, particularly at the roots thereof, such a tooth being divided into two or more main root portions. Furthermore, even if a firm grip is gotten on a molar, it is impossible to exert sufficient force to effect proper extraction by a twisting or rotary pull. The smaller the exposed portion of the tooth, the greater is the difficulty involved, as will be obvious. Oftentimes, the tooth is broken off at the top or decayed so that very little of it is exposed above the gums.

Upper molars, however, present little difficulty as they are quite accessible and may be extracted by ordinary forceps used for this purpose. In extracting an upper molar, the forceps may be moved in a palate-to-cheek movement, or to use dental terms, a linguo-buccally movement. Lower molars, and especially lower wisdom teeth, however, present considerable difficulty and must be extracted in the manner above mentioned. The difficulty of extracting these teeth is due largely to their inaccessibility.

The difficulty of extracting lower molars, and especially lower wisdom teeth, has given rise to the use of a device known as an "elevator" by which the tooth may be raised and loosened in order that it may be gripped by forceps. This practice has been satisfactory to some degree but it often results in breaking of the tooth and, in fact, in some instances, it is necessary to intentionally break the tooth to remove it. By the present invention, there is provided a tooth extracting device by which a lower molar, especially a lower wisdom tooth, may be properly and firmly gripped and extracted with a lever motion, as above described, notwithstanding its inaccessibility. This device makes unnecessary the use of an elevator or the intentional breaking of a tooth to extract the same. The device enables such firm gripping of the tooth and the exertion of such great extracting force applied most advantageously, that the tooth may be readily extracted as a whole with a minimum of inconvenience and discomfort to the patient.

The invention may be more clearly understood from the following detailed description of the preferred form of the device and the application thereof shown on the accompanying drawing. In the drawing:

Fig. 1 is a side elevational view of the novelly constructed forceps;

Fig. 2 is an end view of the forceps as observed from the beak end thereof;

Fig. 3 illustrates the manner of application of the forceps to a lower molar; and Fig. 4 supplements the showing of Fig. 3 and illustrates further the manner of operation of the forceps.

Referring to the drawing, the forceps comprise generally a pair of pivotally connected members 1 and 2, the pivot being shown at 3, and in this general structure, they are similar to any conventional forceps. At one end, the members 1 and 2 are formed to provide handles 4 and 5 superposed one above the other. At the other end, the members are formed to provide gripping jaws 6 and 7.

In accordance with the present invention, the jaws are especially designed in relation to the longitudinal axis of the forceps and the direction of operation of the handles to enable the method of extraction above described. To this end, the jaws are formed to comprise laterally-extending portions 8 and 9, as shown more clearly in Figs. 2 and 3, these portions extending from the pivoted parts of members 1 and 2, respectively, in the general direction of the pivot and at a substantial angle to the longitudinal axis of the instrument. At the outer ends of the extending portions 8 and 9, there are formed beaks 10 and 11 which are arranged for gripping action in a direction substantially parallel to the longitudinal axis of the forceps and substantially perpendicular to the direction of operation of the handles. This is more clearly shown in Figs. 1 and 4. Describing the structure differently, the beaks are arranged in a plane which is substantially parallel to the plane of the handles and substantially perpendicular to the pivot. The beaks may, of course, be shaped as desired to adapt them to any particular tooth or teeth.

The forceps shown are left hand forceps and are adapted to extract lower left hand molars and especially wisdom teeth. For the extraction of lower right hand molars, a second pair of forceps should be used, such forceps being constructed similarly to those shown excepting that the laterally-extending portions should extend on the other side of the instrument so as to offset the beaks from the body of the device in the right direction. Inasmuch as this is the only difference between right and left hand forceps constructed in accordance with the invention, there is no need to illustrate both forms herein.

The left hand forceps shown are applied in Fig. 3 to a lower left hand molar 12 seated in the lower jaw bone 13. The outline of the face, and particularly the mouth, is shown in broken line at 14. Because of its rearward position, a tooth such as the tooth 12 shown is quite inaccessible and it is very difficult to extract the same. The forceps constructed in accordance with this invention, however, may be readily inserted into the patient's mouth from the side thereof and, when so inserted, the beaks of the forceps will be in a position to firmly grip the tooth as illustrated. The pivotal part of the forceps rest against the edge of the cheek or the opened corner of the mouth as illustrated.

When the tooth is thus gripped by the forceps, extraction may be effected simply by moving the forceps handles in lever fashion as illustrated by the arrow-head line in Fig. 4. If it is necessary to loosen the tooth, the handles may be moved in both directions and finally moved forcibly downward to completely remove the tooth. By virtue of the specific arrangement of the jaws with respect to the longitudinal axis of the instrument and also with respect to the direction of actuation of the handles, the desired force may be applied to the tooth. Moreover, the offset position of the beaks enables proper gripping of the tooth prior to extraction thereof. It is also characteristic of the forceps that the dentist's vision is not obstructed and he is enabled to readily grip any desired tooth. Actual use of the device has shown it to be far superior to any devices which have been previously used for the same purpose.

Although a specific form of the device has been illustrated and described for the purpose of disclosure, it will be understood that modifications may be made without departing from the scope of the invention provided the principles of construction herein set forth are maintained.

I claim:

Dental forceps, comprising a pair of pivotally connected members, formed at one end to provide handles and at the other end to provide gripping jaws, and having their pivot aligned with said handles and in the common plane thereof, said jaws being bent beyond the pivot so as to extend laterally from the said common plane of the handles, and beaks extending from the lateral portions of the jaws at right angles to the handles and lying in a plane parallel to the plane of the handles, said beaks being arranged to operate in a direction parellel to the longitudinal axis of the instrument and perpendicular to the direction of operation of the handles.

GEORGE C. KRAJESKI.